A. F. COOPER.
Vehicle-Axle Box.

No. 209,381.  Patented Oct. 29, 1878.

Witnesses
Frank D. Allen
F. L. Houghton

Inventor
Almond F. Cooper
by his Attorney
Ch. Houghton

UNITED STATES PATENT OFFICE.

ALMOND F. COOPER, OF CAMBRIDGE, MASSACHUSETTS.

IMPROVEMENT IN VEHICLE-AXLE BOXES.

Specification forming part of Letters Patent No. 209,381, dated October 29, 1878; application filed July 1, 1878.

*To all whom it may concern:*

Be it known that I, ALMOND F. COOPER, of Cambridge, in the county of Middlesex and Commonwealth of Massachusetts, have invented a new and useful Improvement in the Application of Elastic Rubber Cushions to the Axle-Boxes of Vehicles, of which the following is a specification:

My invention consists in the manner of applying and securing the rubber cushion to the axle-box of ordinary street-vehicles, so that the whole load of the vehicle and its contents or passengers shall rest upon the rubber axle-cushions.

Figure 1:
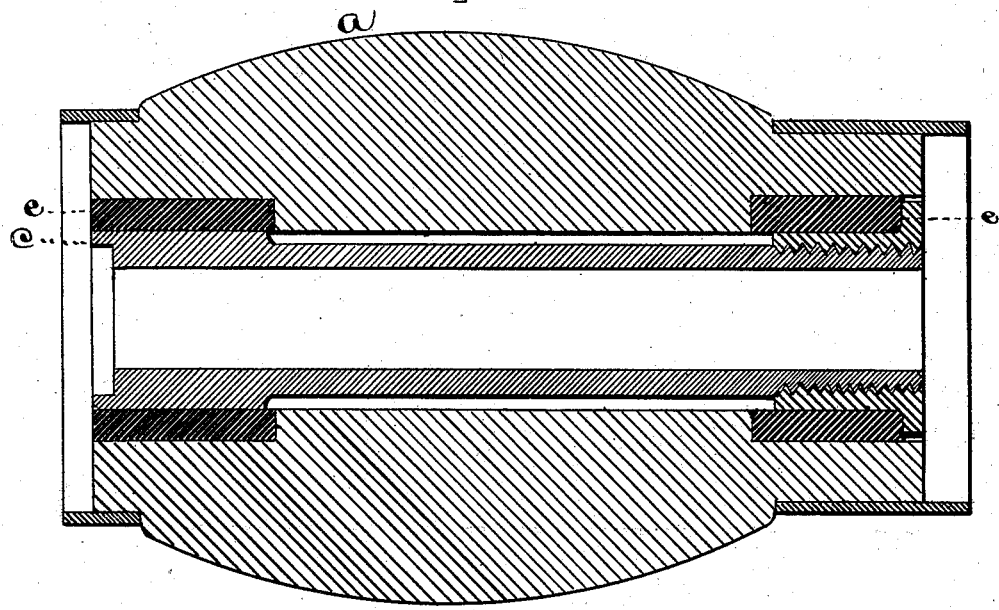

In the drawings annexed, Figure 1 shows a longitudinal section of a vehicle-hub, the axle-box in it, and the elastic rubber cushions at each end of the box. *a* shows the wooden part of the hub. *c* shows the axle-box. *e e* shows the rubber cushions on the axle-box.

Figure 2:
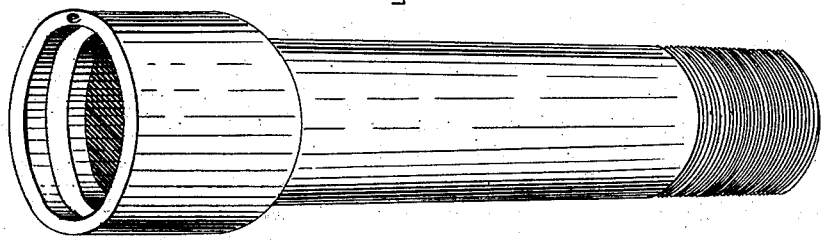
Figure 3:
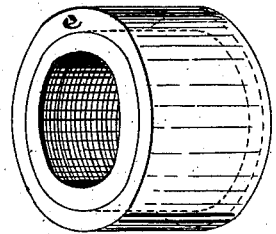

Fig. 2 shows a side view of the axle-box with the rubber cushions on the larger end of it. Fig. 3 shows the nut which goes onto the smaller end of the box, with the rubber cushion affixed to it.

The smaller end of the axle-box is threaded with a screw to receive the nut.

The axle-box made in the ordinary manner, ready to put in the hub, and bored out for the axle, with the addition of a screw-thread and nut, as shown in the drawings, is ready to receive the rubber cushion. Then a box-mold of the size and form to leave a space between it and the outside of the larger end of the axle-box of the form and dimensions which the rubber cushion is to take is clamped or otherwise properly secured to the axle-box, covering about one inch and one-half of the length of the axle-box from its larger end. This box-mold is then filled with elastic rubber in a state of preparation suitable and ready for the process known as "vulcanizing." The whole is then placed in the vulcanizing-oven, and there remains subjected to heat, as may be required, to give it the proper elastic and durable condition.

The nut which goes on the smaller end of the axle-box is inclosed in a mold, which is also filled with rubber and vulcanized, as before described.

To make the rubber cushion adhere firmly to the axle-box and nut, a clean surface is given to the metal by turning, or other suitable method; and when the rubber is vulcanized it adheres to the metal, so that it cannot be displaced except by cutting or burning.

To prevent the rubber from adhering to the inside of the mold, a coating of plumbago is carefully rubbed over its entire inner surface.

The axle-box thus cushioned is ready to place in the hub. The wooden body of the hub is bored through, the diameter of the hole being a little larger—say, one-sixteenth of an inch in diameter—than the outside diameter of the axle-box. The two ends of the wooden hub are then chambered to receive the rubber cushions; but the inner diameter of these chambers is a little smaller than the outside diameter of the rubber cushions—say, about one-sixteenth of an inch, or perhaps a little less than that in small hubs. The rubber cushion and the inside of the chambers in the hub being well moistened with water, the axle-box with its rubber cushion is then forced into its proper position in the hub by strong pressure, and the nut on the smaller end of the axle-box turned up to its place.

When the water which has served as a lubricator has evaporated, the rubber cushions and wooden hubs so adhere to each other that it will be impossible to turn the box around in the hub, and oil or other foreign substances cannot penetrate between the elastic cushion and its surrounding chamber of wood, nor between it and the axle-box.

I am aware that elastic rubber cushions have been applied to axle-boxes in several varying forms, as described in patents issued to Woodside, Raddin, Whiting, and others, and therefore do not broadly claim the application of elastic rubber cushions to axle-boxes;

nor do I claim either of the several methods described in said patents of applying such cushions; but What I do claim as new and my invention is—

1. In combination with an axle-box for vehicles, rubber cushions, one at each end, when the same are affixed to the axle-box at one end, and a nut made to fit the axle-box at the other by vulcanizing the rubber on the box and nut.

2. As a new article of manufacture, an axle-box for vehicles, fitted with a rubber cushion or cushions, when the cushions are affixed to the box by vulcanizing them on.

ALMOND F. COOPER.

Witnesses:
   CHS. HOUGHTON,
   JAMES LELAND.